US012706315B2

(12) United States Patent
Planque et al.

(10) Patent No.: US 12,706,315 B2
(45) Date of Patent: Aug. 11, 2026

(54) METHOD FOR MANUFACTURING AN ELECTRICAL CONDUCTOR, SUCH AS A CURRENT ROD, FOR A HIGH-TEMPERATURE ELECTROCHEMICAL DEVICE

(71) Applicant: COMMISSARIAT À L'ÉNERGIE ATOMIQUE ET AUX ÉNERGIES ALTERNATIVES, Paris (FR)

(72) Inventors: Michel Planque, Grenoble (FR); Géraud Cubizolles, Grenoble (FR)

(73) Assignee: COMMISSARIAT À L'ÉNERGIE ATOMIQUE ET AUX ÉNERGIES ALTERNATIVES, Paris (FR)

( * ) Notice: Subject to any disclaimer, the term of this patent is extended or adjusted under 35 U.S.C. 154(b) by 563 days.

(21) Appl. No.: 18/257,245

(22) PCT Filed: Dec. 16, 2021

(86) PCT No.: PCT/FR2021/052357
§ 371 (c)(1),
(2) Date: Jun. 13, 2023

(87) PCT Pub. No.: WO2022/136772
PCT Pub. Date: Jun. 30, 2022

(65) Prior Publication Data

US 2024/0097149 A1 Mar. 21, 2024

(30) Foreign Application Priority Data

Dec. 21, 2020 (FR) ...................................... 2013788

(51) Int. Cl.
*H01M 8/0206* (2016.01)
*B23K 20/02* (2006.01)
(Continued)

(52) U.S. Cl.
CPC ......... *H01M 8/0206* (2013.01); *B23K 20/021* (2013.01); *B32B 1/08* (2013.01);
(Continued)

(58) Field of Classification Search
CPC ................. H01M 8/0206; H01M 8/12; H01M 2008/1293; B23K 20/021; B23B 1/08; B23B 15/011; H01B 1/02
(Continued)

(56) References Cited

U.S. PATENT DOCUMENTS 1,908,859 A * 5/1933 O'Neill ..................... H01J 5/40 428/592
7,850,495 B2 * 12/2010 Niles ..................... H01R 13/33 439/930

(Continued)

FOREIGN PATENT DOCUMENTS

EP 2537207 A1 12/2012
EP 3098889 A1 11/2016
JP H01283772 A 11/1989

OTHER PUBLICATIONS

International Search Report for PCR/FR2021/052357 dated Apr. 28, 2022.

(Continued)

*Primary Examiner* — Gary F Paumen
(74) *Attorney, Agent, or Firm* — Chrisman Gallo Tochtrop LLC

(57) ABSTRACT

A method for manufacturing an electrical conductor, such as a current rod, comprising the following successive steps: —providing a core made of a first metallic material, —providing a sheath made of a second metallic material, the sheath being intended to cover a first part of the core, —providing a connection terminal made of a third metallic material, —assembling the core and the connection terminal,
(Continued)

by crimping, or by crimping and brazing, or by braze welding, or by brazing, —assembling the core and the connection terminal with the sheath.

20 Claims, 3 Drawing Sheets

(51) Int. Cl.
*B32B 1/08* (2006.01)
*B32B 15/01* (2006.01)
*H01B 1/02* (2006.01)
*H01M 8/12* (2016.01)

(52) U.S. Cl.
CPC .............. *B32B 15/011* (2013.01); *H01B 1/02* (2013.01); *H01M 8/12* (2013.01); *H01M 2008/1293* (2013.01)

(58) Field of Classification Search
USPC ......................................... 439/283, 877, 874
See application file for complete search history.

(56) References Cited

U.S. PATENT DOCUMENTS 8,882,549 B2 * 11/2014 Suzuki .................. H01R 4/188 439/882
2009/0117787 A1 5/2009 Kerner
2012/0295496 A1 * 11/2012 Suzuki .................. H01R 4/203 439/882

OTHER PUBLICATIONS

Written Opinion for PCR/FR2021/052357 dated Apr. 28, 2022.
Written Opinion for PCR/FR2021/052357 dated Nov. 10, 2022.

* cited by examiner

METHOD FOR MANUFACTURING AN ELECTRICAL CONDUCTOR, SUCH AS A CURRENT ROD, FOR A HIGH-TEMPERATURE ELECTROCHEMICAL DEVICE

CROSS-REFERENCE TO RELATED APPLICATIONS

This is a National Stage application of PCT international application PCT/FR2021/052357, filed on Dec. 16, 2021, which claims the priority of French Patent Application No. FR 2013788, filed Dec. 21, 2020, both of which are incorporated herein by reference in their entirety.

TECHNICAL FIELD

The present invention relates to the general field of high-temperature electrochemical devices such as fuel cells and solid-oxide electrolysers, and more particularly to the supply of electric current to a stack of electrochemical cells operating at high temperature (typically higher than 450° C. and even higher than 600° C.).

The invention is particularly interesting since it allows having an assembly having a very good mechanical solidity, an excellent resistance to oxidation and a good electrical conductivity, and using a wide range of materials such as cast irons and special steels.

PRIOR ART

As represented in FIG. 1, the solid-oxide electrolysis cells 10 (SOEC, standing for "Solid-Oxide Electrolyser Cell") transform, within the same system, the water steam $H_2O$ into $H_2$ at the cathode 11 and into $O_2$ at the anode 12 (or the $CO_2$ into CO and $O_2$), under the effect of an electric current. The cathode 11 and the anode 12 are separated by a dense solid-oxide electrolyte 13 operating at high temperature and enabling the passage of ions (herein anions $O^{2-}$).

In the case of solid-oxide fuel cells (SOFC, standing for "Solid-Oxide Fuel Cell"), the fuel cell is supplied with $H_2$ and $O_2$, and possibly with $_{CH4}$ and air. Hence, a SOFC cell operates in the reverse way compared to that of a SOEC electrolyser: it produces an electric current and heat by being supplied with hydrogen (or natural gas, ammonia or carbon monoxide) and air.

Nowadays, these systems can operate at high temperatures (between 600° C. and 1,000° C.).

Next, we will describe in detail a SOEC electrolyser in the electrolysis mode (the $H_2O/H_2$ and $O_2$ pair). In general, an electrolyser is formed by a stack of elementary modules 10 set in series (FIG. 2).

An elementary module 10 comprises an assembly (also called an electrochemical cell) formed by an electrolyte 13 with two electrodes 11, 12 and clasped between two interconnection plates 14, 15 (also called "interconnectors"). Hence, a complete electrolyser is an alternate stack of electrochemical cells and interconnectors. The assembly, in the form of a stack, of the cells is generally referred to as: "stack".

Each interconnection plate 14 is an electronic conductor, for example a metal plate, which is in contact on one side with the cathode 12 of one cell and on the other face with the anode 21 of the next cell.

The first role of the interconnectors 14, 15 is to supply the cell with electric current. In addition, they are also intended to distribute the fuels and to recover the gases produced while separating the anode and cathode compartments of two adjacent cells.

In the electrolysis mode, the cathode compartment contains water steam and hydrogen (and/or CO if there is $CO_2$ at the inlet), the product of the electrochemical reaction. The anode compartment contains a draining gas should the latter exists and oxygen, another product of the electrochemical reaction both in the case of the electrolysis of water or of carbon dioxide.

In the SOFC mode, the anode compartment contains the fuel, while the cathode compartment contains the oxidiser.

An electrical conduction device (also called current rod or current supply device) is connected, on the one hand, to the terminals of the stack and, on the other hand, to a current source or to a load according to the operating mode of the device (electrolyser/fuel cell).

The proper operation of this type of stack requires above all:

- electrical insulation between two successive interconnectors otherwise the cell is short-circuited, but also a good electrical contact and a sufficient contact surface between a cell and an interconnector; the lowest possible ohmic resistance is desired between the cell and the interconnectors,
- sealing between the two compartments (oxidiser—$O_2$) and (fuel $H_2/CO/CH_4/NH_3$) otherwise the produced gases recombine resulting in a decrease in efficiency and above all the apparition of hot spots damaging the stack,
- good gas distribution both at the fuel inlet and at the product recovery, otherwise there will be a loss of efficiency, pressure and temperature inhomogeneity within the different elementary modules and possibly prohibitive damages to the cell,
- an electrical conduction device suitable for currents of several hundred amperes, resistant to high-temperature oxidation and withstanding thermal cycling up to 900° C.

As regards this last point, for example, in the document EP 3 098 889 A1, the electrical conduction device 20 comprises a core 21 made of copper, protected by a sheath 22, made of a stainless alloy (FIG. 3). A whistle 23, serving as a connection terminal, is in contact with the core 21 and is positioned at one end of the sheath 22. To manufacture such an electrical conduction device, a closing endpiece completed with a tube for drawing vacuum is positioned at the other end of the sheath. After assembly of these elements by TIG ("Tungsten Inert Gas"), a hot isostatic pressing (HIP) is carried out to obtain a diffusion welding guaranteeing the durability of the mechanical and electrical properties, even after numerous thermal cycles.

However, this assembly does not guarantee that the surface of the whistle 23 is positioned perfectly plane on plane with the planar surface of the copper core. Indeed, one of these parts or both parts may have, for example, flatness defects due to geometric defects (FIG. 4A) or due to cutout striations (FIG. 4B) at the contact area (surrounded area in FIGS. 4A and 4B).

Yet, the HIP cycle does not allow solving this problem because the HIP herein acts radially, and not longitudinally. Thus, the fault present initially will remain upon completion of the HIP.

The electric current can flow only through the contact points. If there are flatness defects on the surfaces in contact, the passage of the current will be done entirely through the only contact points, which will locally increase the current density, the electrical resistance of the connection will subsequently involve a thermal dissipation higher than in the case of total contact. These two phenomena could lead to a degradation of the materials which may lead to a loss of the integrity of the contact between the two materials.

Thus, it is essential to have the best possible plane/plane contact between the copper core and the whistle (parallelism, surface condition . . . ).

DISCLOSURE OF THE INVENTION

The present invention aims to provide an electrical conduction device suitable for currents of several hundred amperes, resistant to oxidation at high temperature and supporting thermal cycling up to 900° C. and overcoming the drawbacks of the prior art.

For this purpose, the present invention provides a method for manufacturing an electrical conductor, like a current rod, comprising the following successive steps:

- providing a core (or rod) made of a first metallic material,
- providing a sheath made of a second metallic material, the sheath being intended to cover a first portion of the core,
- providing a whistle (also called connection terminal) made of a third metallic material,
- assembling the core and the whistle,
- assembling the sheath and the core, in particular by fitting,
- the assembly of the sheath on the first portion of the core being carried out by hot isostatic pressing,
- the assembly of the whistle and of the core being carried out by crimping, or by crimping and brazing, or by braze-welding, or by brazing.

The invention differs essentially from the prior art by the technique of assembling the whistle and the core.

In addition, the assembly of the sheath on the first portion of the core is carried out by hot isostatic pressing (HIP). HIP allows for a better mechanical strength when hot than crimping (crimping will see the mechanical holding constraints reduced during the rise in temperature).

Advantageously, the core is made of copper.

Advantageously, the sheath is made of stainless steel or of an alloy and of stainless nickel and the connection terminal (or whistle) is made of a stainless alloy.

Advantageously, the whistle is made of stainless steel.

Advantageously, the sheath is made of stainless steel.

According to a first variant, the assembly is carried out by crimping. The manufacturing method may be carried out by:

- inserting the core into the counterbore of the whistle, so that the whistle covers a second portion of the core,
- crimping the second portion of the core covered by the whistle, preferably with a force of 20 kN,
- covering the first portion of the core with the sheath then welding the sheath on the first portion of the core, by hot isostatic pressing.

Crimping allows immobilising two parts by deformation without resorting to welding, which avoids having a heat-affected area. This technique is carried out without adding material, which allows obtaining assemblies at a lower cost. In addition, this technique is simple and quick to implement. It may be implemented safely. It forms no oxide and does not pollute.

According to a second variant, the assembly is carried out by crimping and brazing. According to a particular embodiment, the manufacturing process may be carried out by:

- positioning a brazing material in a counterbore of the whistle,
- inserting the core into the counterbore of the whistle, so that the whistle covers a second portion of the core, the core being inserted into the counterbore until it comes into contact with the brazing material,
- crimping the second portion of the core covered by the whistle, preferably with a force of 20 kN,
- carrying out a brazing, so as to melt the brazing material, whereby after cooling of the molten brazing material, a brazed joint is obtained between the whistle and the core,
- covering the first portion of the core with the sheath then welding the sheath on the first portion of the core, by hot isostatic pressing.

According to another particular embodiment, the manufacturing process may be carried out by:

- positioning a brazing material in the counterbore of the whistle,
- inserting the core into the counterbore of the whistle, so that the whistle covers a second portion of the core, the core being inserted into the counterbore until it comes into contact with the brazing material,
- crimping the second portion of the core covered by the whistle, preferably with a force of 20 kN,
- covering the first portion of the core with the sheath then welding the sheath on the first portion of the core, by hot isostatic pressing, at a temperature high enough to melt the brazing material, whereby in one single step, simultaneously, the hot isostatic pressing and a brazed joint is obtained between the whistle and the core.

Brazing in addition to crimping improves the mechanical strength of the electrical conductor. The method is simplified when the brazing is carried out at the same time as the hot isostatic pressing According to a third variant, the assembly is carried out by braze-welding. The manufacturing method may be carried out by:

- positioning a brazing material between the whistle and the core,
- carrying out a braze-welding, so as to obtain a braze-welded joint between the whistle and the core,
- covering the first portion of the core by the sheath, the core being preferably totally covered by the sheath, the sheath being in contact with the whistle, then welding the sheath on the first portion of the core, by hot isostatic pressing.

Braze-welding is a welding by diffusion of different materials, in the solid state, without adding any filler metal. This process consists in applying a force at hot on the parts to be welded for a given time.

The braze-welded joint between the whistle and the core is particularly resistant, and withstands the heating temperatures used for high-temperature electrochemical devices.

Advantageously, the brazing material is an alloy based on copper and zinc, which may further contain silicon. This embodiment is particularly advantageous for operating temperatures lower than 600° C.

According to another advantageous variant, the brazing material is an alloy based on copper, zinc and nickel which may further contain silver (in particular Cu/Zn/Ni/Ag) or an alloy based on Cu/Mn, Cu/Mn/Ni or Ni/Cr/P. This embodiment is particularly advantageous for operating temperatures comprised between 600 and 900° C.

The invention also relates to an electrical conductor, like a current lead, obtained with the previously-described method.

Such an electrical conductor comprises a core, a whistle (or connection terminal) and a sheath, the sheath covering a first portion of the core.

The sheath is welded on the first portion of the core.

According to a first variant, the core may be crimped into the whistle.

According to a second variant, the core is crimped into the whistle and brazed with the whistle.

According to a third variant, the core is braze-welded to a whistle by means of a braze-welded joint, the braze-welded joint being preferably an alloy based on Cu/Zn/Ni/Ag, Cu/Mn, Cu/Mn/Ni, Ni/Cr/P.

Advantageously, the sheath is made of stainless steel or of an alloy and of stainless nickel and the connection terminal (or whistle) is made of a stainless alloy.

Such a device has very good electrical and mechanical properties, even after many high-temperature operating cycles as may be the case for electrochemical devices such as fuel cells and solid-oxide electrolysers.

Other features and advantages of the invention will arise from the following complementary description.

It goes without saying that this complementary description is given only for illustration of the object of the invention and should in no way be interpreted as a limitation of this object.

BRIEF DESCRIPTION OF THE DRAWINGS

The present invention will be better understood upon reading the description of embodiments given for purely indicative and non-limiting purposes with reference to the appended drawings wherein.

Figure 1:
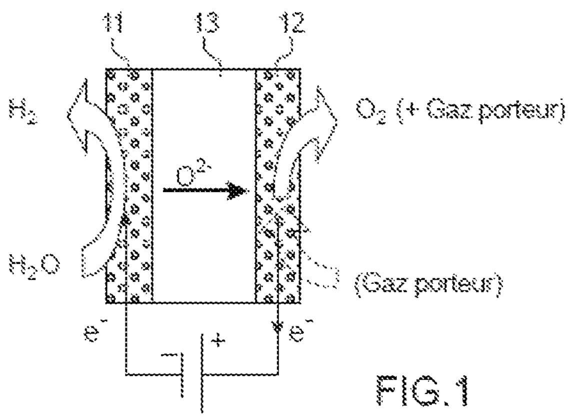
FIG. 1, already described before, schematically represents the operating principle of a high-temperature electrolyser (SOEC).
Figure 2:
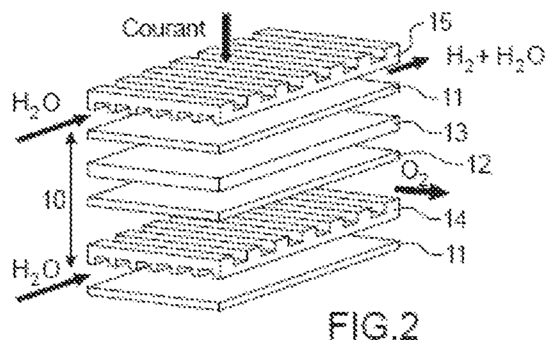
FIG. 2, already described before, schematically represents the main components of a high-temperature electrolyser (SOEC).
Figure 3:
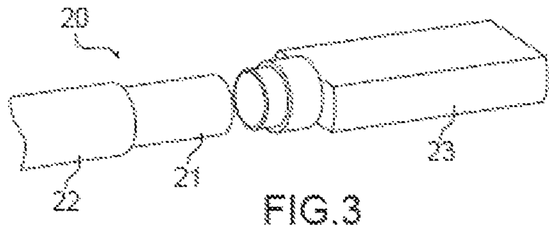
FIG. 3, already described before, schematically represents an exploded view of a current lead.
Figure 4A:
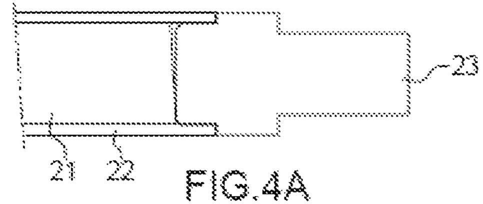
FIGS. 4A and 4B, already described before, schematically represent examples of faults in a current lead, at the whistle/core interface.
Figure 4B:
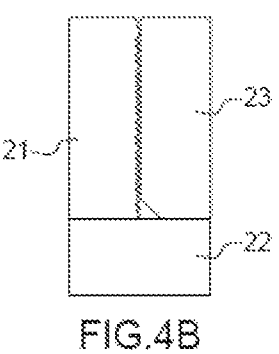

The different portions represented in the figures are not necessarily plotted according to a uniform scale, to make the figures more readable.

DETAILED DISCLOSURE OF PARTICULAR EMBODIMENTS

Next, even though the description refers, more particularly, to the assembly of a current rod, the invention is generally transposable to assemblies of very resistant metals and/or alloys such as cast irons and special steels. In particular, the invention finds applications for the assembly of steels having poor weldability, the assembly of different metals and alloys, the assembly of galvanised and stainless steels, the assembly of copper and its alloys, the assembly of aluminium and its alloys or to form assemblies with little or no deformations.

We will now describe the method for manufacturing an electrical conductor, and more particularly, a current rod (also called current lead) with reference to FIGS. 5 to 9.

The parts to be assembled to form the current rod are the core 110 made of a first metallic material, the sheath 120 made of a second material and the whistle 130 made of a third material.

The whistle 130 is also commonly called connection terminal.

The core 110 is a good electrical conductor but is sensitive to oxidation, for example nickel, silver, copper or copper alloys. Preferably, the core 110 is copper. For example, it may consist of Cuc1 or Cua1 copper. The core 110 is a rod.

The core 110 is inserted into a sheath 120. The sheath 120 is a tube. The sheath comprises first and second ends. On the side of the first end, the sheath 120 covers a first portion 111 of the core 110 (core/sheath overlap area). By its properties of resistance to oxidation which are higher than those of the core 110, it ensures the protection of the latter against the oxidising atmosphere. In this manner, it allows benefiting from the better electrical conductivity of the material of the core by maximising the service life of the assembly in an oxidising atmosphere. For example, the sheath 120 is made of stainless steel or stainless nickel alloy. The second end is intended to be secured with a non-represented endpiece.

The whistle 130 is intended to be connected to the plate of the electrolyser. It acts as a connection leg and ensures the electrical connection with the electrolyser. It has a shape complementary to the plate of the electrolyser on which it is fastened. The whistle 130 may be pierced (through hole 131) perpendicular to the axis of the sheath so as to be screwed onto the stack of the electrolyser. The whistle 130 may have a geometry other than that illustrated in the figures. For example, it may be cylindrical and intended to fit into a bore or clamped between two half-shells secured to the device to be powered.

Once assembled to the first end of the sheath 120, the whistle 130 hermetically seals this end, and thus avoids the passage of gas.

Preferably, the whistle 130 is made of a stainless alloy, for example a nickel-chromium-iron alloy such as Inconel® 600.

Prior to the assembly of the parts, the preparation of their surfaces is advantageously carried out by a means, or a set of appropriate means (sandblasting, brushing, pickling with detergents and/or solvents in particular).

According to the invention, the assembly of the core 110, of the sheath 120 and of the whistle 130 to form the electrical conductor may be carried out according to different production processes: crimping, or crimping and brazing or braze-welding, and hot isostatic pressing.

Figure 5:
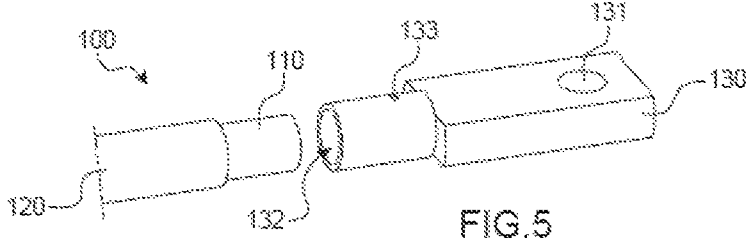
FIG. 5 schematically represents an exploded view of a current lead, according to a particular embodiment of the invention.
Figure 6:
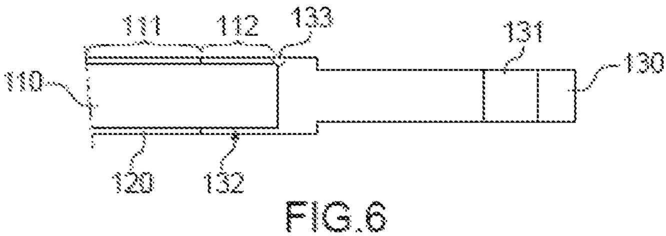
FIG. 6 schematically represents a sectional view of the current lead represented in FIG. 5.
Figure 7:
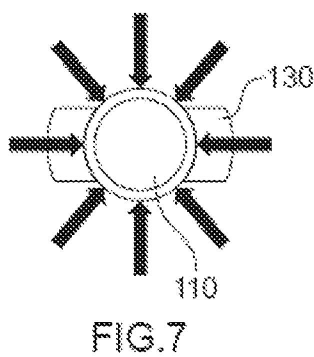
FIG. 7 schematically represents the pressure exerted during crimping on the periphery of the crimping area of the current lead, according to a particular embodiment.

We will now describe in more detail the first embodiment (assembly by crimping) represented in FIGS. 5, 6 and 7. In this embodiment, a whistle 130 comprising a counterbore 132 will advantageously be used. The counterbore 132 is a blind hole with a flat bottom. The counterbore 132 may have a depth, for example from 8 to 20 mm. The diameter of the counterbore 132 depends on the diameter of the core 110. The core 110 is inserted into the counterbore. Once assembled, the counterbore 132 covers a second portion 112 of the core 110 (core/whistle overlap area). Advantageously, a clearance of 5/100$^{th}$ is selected between the core and the counterbore of the whistle. Advantageously, the wall of the counterbore 132 is provided with a through hole 133 to enable the evacuation of air during the insertion of the core 110 into the counterbore 132 of the whistle 130.

Once the core 110 has been inserted into the counterbore 132, crimping is carried out by exerting a pressure on the periphery of the core/whistle overlap area 112 (FIG. 7). The crimping may be carried out with an electromechanical crimping tool. Afterwards, a crimping force, dependent on the effective dimensions of the assembly and the mechanical properties of the material to be crimped, is applied. In the case described herein (Inconel 600 tube, diameter in the range of 10 mm), a force in the range of 20 kN is enough to obtain a satisfactory crimping.

Afterwards, the sheath 120 is positioned so as to cover the first portion 111 of the core 110. Thus, the core 110 is completely covered on the one hand by the sheath 120 and on the other hand by the whistle 130. Once the whistle 130 and the sheath 120 are brought into contact, they are advantageously welded in order to seal the assembly.

The crimping being carried out at room temperature (typically between 20 and 25° C.), the molecular structure of the core 110 made of copper is not deformed by heating, which guarantees an extended service life. Crimping is a durable assembly technique.

We will now describe in more detail the second embodiment (assembly by crimping+brazing).

According to this second embodiment, it is proceeded as in the first embodiment by further positioning a brazing material in the counterbore in the whistle 130 before inserting the core 110. Preferably, the brazing material is positioned over the flat bottom of counterbore 132. The brazing material 132 (also called filler material) may be in the form of a pellet or a paste that can be spread. Once the core 110 has been inserted into the counterbore 132, the brazing material is in contact with the two parts to be assembled (i.e. with the whistle and the core). The placement of a brazing pellet during mounting with a thickness, preferably comprised between 25 μm and 200 μm, and even more preferably 100 μm, advantageously allows accommodating the defects and creating a connection between the inconel and copper, ensuring electrical continuity.

The brazing step is carried out by:

heating the two parts 110, 130 and the brazing material up to an assembly temperature higher than the melting temperature of the brazing material, so as to melt the brazing material, and maintaining the assembly temperature for a holding time, the brazing temperature depends on the selected brazing alloy, it is preferably higher than the temperature at which the assembly will be operated, i.e. 900° C. in the case of a current bar of an electrolyser/SOFC fuel cell type system, cooling the assembly so as to form a brazed joint between the whistle 130 and the core 110, and to assemble them.

Advantageously, the brazing is carried out during the hot isostatic pressing.

Figure 8:
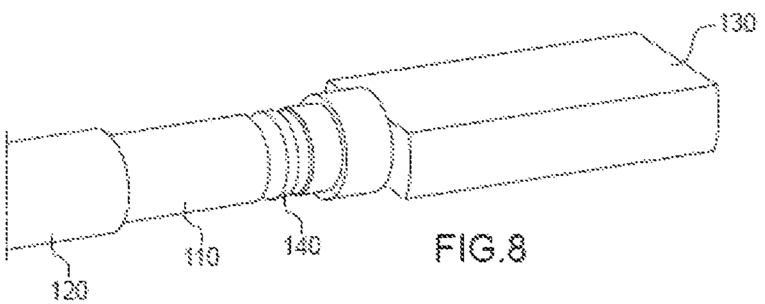
FIG. 8 schematically represents an exploded view of a current lead, according to another particular embodiment of the invention.
Figure 9:
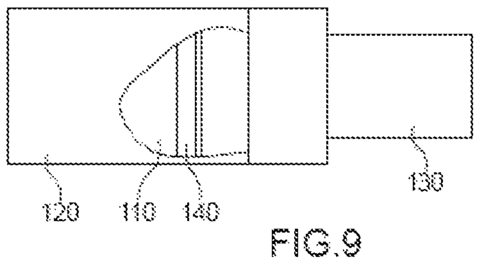
FIG. 9 schematically represents a sectional view of the current lead represented in FIG. 8.

We will now describe in more detail the third embodiment (assembly by braze-welding—oxyacetylene welding process) represented in FIGS. 8 and 9.

In this embodiment, the whistle 130 does not comprise a counterbore. It has a shape complementary to the sheath 120: the sheath 120 fits around one of the ends of the whistle 130.

According to this third embodiment, the assembly is carried out according to the following steps:

positioning the brazing material 140 between the core 110 and the whistle 130, carrying out a braze-welding of the assembly thus obtained, so as to have an assembly comprising a core 110 connected to the whistle 130 by a braze-welded joint, inserting the core 110, the braze-welded joint and a portion of the whistle 130 into the sheath 120.

Preferably, the brazing material 140 is an alloy of copper and zinc. This alloy may further contain silicon.

For example, a Cu—Zn—Ag alloy commercialised under the reference 16 XFC® by the company Castolin Eutectic will be selected.

According to another embodiment, the assembly of the whistle 130 and of the core 110 could be carried out by brazing (without implementing crimping).

Once the core 110, the sheath 120 and the whistle 130 have been assembled (by crimping and/or by brazing or by braze-welding), this assembly is advantageously subjected to a hot isostatic pressing step in order to weld the sheath 120 to the core 110 and thus reinforce the mechanical strength of the final assembly.

According to a particular embodiment of the method, diffusion welding by hot isostatic pressing comprises the following steps:

TIG ("Tungsten Inert Gas") welding a degassing tube on the second end of the sheath 120, the second end of the sheath 120 being opposite to that one in contact with the whistle 130, TIG welding a cap (or closure endpiece) to seal this second end. Preferably, the endpiece and its tube are made of a stainless alloy, for example AISI 316L. The endpiece hermetically seals the second end of the sheath 120 except at the degassing central tube which crosses it therethrough and which is in communication with the sheath 120, placing the sheath under vacuum by pumping via the tube of the first end—this allows drawing the gas present between the core 110 and the sheath 120, sealing this tube, for example by pinching off the sheath 120, applying a diffusion welding cycle by hot isostatic pressing (HIP) to the assembly.

Advantageously, the welding cycle by HIP may comprise the following steps:

bringing the assembly formed by the core 110 and the sheath 120 to a temperature comprised between 600° C. and 1,060° C., preferably between 800° C. and 1,000° C., even more preferably between 900° C. and 1,000° C., in particular a temperature of 920° C.; and applying on the sheath 120 a pressure comprised between 500 bars and 1,500 bars, preferably between 800 bars and 1,200 bars, in particular a pressure of 1,020 bars, applying a pressure and temperature level for a period of 30 minutes to several hours, preferably 1 hour to 3 hours, in particular 2 hours, leaving the assembly to cool and depressurise.

Advantageously, the current rod 100 is used in an electrochemical system including:

an enclosure for the circulation of air in the volume delimited thereby an electrochemical device housed in the enclosure (preferably it consists of a high-temperature steam electrolyser or a high-temperature fuel cell), the device comprising:

a stack of elementary electrochemical cells or stack each comprising an electrolyte interposed between a cathode and an anode and connected in series between two electrical terminals, and two electrical conductors as described before respectively connected to the two electrical terminals.

Illustrative and non-limiting examples of one embodiment:

In this example, the 16 XFC® (Cu/Zn/Ag/Ni) brazing material commercialised by Castolin Eutectic is used to make a braze-welded junction between a whistle 130 made of an Inconel® 600 alloy and a core 110 made of copper.

The brazing material 140 is supplied in the form of a stick coated with an Elastec stripper. The stick has a remarkable flexibility, which allows for an excellent visibility of the melt pool during the assembly operation.

The brazing material 140 has the following characteristics: 1% Silver/9% Nickel, Solidus: 885° C., Liquidus: 915° C., Tensile strength: 550 MPa, Elastic limit: 236 MPa, Elongation: 35%, Density: 8.4 and Hardness: 120 HB.

Such a brazing material 140 has high mechanical properties and is particularly suitable for braze-welding steels and cast irons.

The clearance between the core 110 and the whistle 130 may range, for example, up to 0.1 mm because the alloy has good properties in terms of capillarity.

Once the braze-welding has been performed, it is proceeded with mounting of the current rod (fitting of the sheath 120 onto the core 110) and the Hot isostatic pressing (HIP) cycle is performed in order to carry out a diffusion welding of the different materials therebetween, without adding a filler metal.

What is claimed is:

1. A method of manufacturing an electrical conductor, like a current rod, comprising the following successive steps:

providing a core made of a first metallic material, providing a sheath, made of a second metallic material, the sheath being intended to cover a first portion of the core, providing a connection terminal made of a third metallic material, assembling the core and the connection terminal, assembling the core and the connection terminal with the sheath, wherein the sheath is welded on the first portion of the core by hot isostatic pressing, and in that the assembly of the core and of the connection terminal is carried out:

by crimping, or by crimping and brazing, or by braze welding, or by brazing.

2. The method according to claim 1, wherein the assembly of the core and of the connection terminal is carried out by crimping and in that the method is carried out by:

inserting the core into a counterbore of the connection terminal, so that the connection terminal covers a second portion of the core, crimping the second portion of the core covered by the connection terminal, covering the first portion of the core with the sheath then welding the sheath on the first portion of the core, by hot isostatic pressing.

3. The method according to claim 1, wherein the assembly of the core and of the connection terminal is carried out by crimping and brazing and in that the method is carried out by:

positioning a brazing material in a counterbore of the connection terminal, inserting the core into the counterbore of the connection terminal, so that the connection terminal covers a second portion of the core, crimping the second portion of the core covered by the connection terminal, carrying out a brazing, so as to melt the brazing material, whereby after cooling of the brazing material, a brazed joint is obtained between the connection terminal and the core, covering the first portion of the core with the sheath then welding the sheath on the first portion of the core, by hot isostatic pressing.

4. The method according to claim 1, wherein the assembly of the core and of the connection terminal is carried out by crimping and brazing and in that the method is carried out by positioning a brazing material in the counterbore of the connection terminal, inserting the core into the counterbore of the connection terminal, so that the connection terminal covers a second portion of the core, crimping the second portion of the core covered by the connection terminal, covering the first portion of the core with the sheath then welding the sheath on the first portion of the core, by hot isostatic pressing, at a temperature high enough to melt the brazing material, whereby simultaneously the hot isostatic pressing is carried out and a brazed joint is obtained between the connection terminal and the core.

5. The method according to claim 1, wherein the assembly of the core and of the connection terminal is carried out by braze-welding and in that the method is carried out by:

positioning a brazing material between the connection terminal and the core, carrying out a braze-welding, so as to obtain a braze-welded joint between the connection terminal and the core, covering the first portion of the core by the sheath, the sheath being in contact with the connection terminal then welding the sheath on the first portion of the core, by hot isostatic pressing.

6. The method according to claim 5, wherein the brazing material is an alloy comprising copper, zinc and nickel.

7. The method according to claim 1, wherein the core is made of nickel, silver, copper, or a copper alloy.

8. The method according to claim 1, wherein the sheath is made of stainless steel or of a stainless nickel alloy and in that the connection terminal is made of a stainless alloy.

9. The method according to claim 1, wherein the connection terminal is made of stainless steel.

10. The method according to claim 1, wherein the sheath is made of stainless steel.

11. The method according to claim 7, wherein the core is made of copper.

12. The method according to claim 3, wherein the brazing material has a thickness between 25 μm and 200 μm.

13. The method according to claim 4, wherein the brazing material has a thickness between 25 μm and 200 μm.

14. The method according to claim 3, wherein the brazing is carried out at a brazing temperature greater than 900° C.

15. The method according to claim 4, wherein the temperature high enough to melt the brazing material is greater than 900° C.

16. The method according to claim 2, wherein the second portion of the core covered by the connection terminal is crimped with a force in the range of 20 kN.

17. The method according to claim 3, wherein the second portion of the core covered by the connection terminal is crimped with a force in the range of 20 kN.

18. The method according to claim 4, wherein the second portion of the core covered by the connection terminal is crimped with a force in the range of 20 kN.

19. The method according to claim 6, wherein the alloy further comprises silver.

20. The method according to claim 1, wherein the assembly of the core and of the connection terminal is carried out by a method including a brazing step employing a brazing material having a thickness between 25 μm and 200 μm.

* * * * *